(12) United States Patent
Emerson et al.

(10) Patent No.: US 10,474,606 B2
(45) Date of Patent: Nov. 12, 2019

(54) MANAGEMENT CONTROLLER INCLUDING VIRTUAL USB HOST CONTROLLER

(71) Applicant: Hewlett Packard Enterprise Development LP, Houston, TX (US)

(72) Inventors: Theodore F. Emerson, Houston, TX (US); David F. Heinrich, Houston, TX (US); Richard Wei Chieh Yu, Houston, TX (US); Robert L. Noonan, Crystal Lake, IL (US); Christopher J. Frantz, Houston, TX (US); Sze Hau Loh, Houston, TX (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 136 days.

(21) Appl. No.: 15/436,015

(22) Filed: Feb. 17, 2017

(65) Prior Publication Data
US 2018/0239728 A1    Aug. 23, 2018

(51) Int. Cl.
| | |
|---|---|
| *G06F 13/38* | (2006.01) |
| *G06F 9/455* | (2018.01) |
| *G06F 13/42* | (2006.01) |
| *G06F 13/28* | (2006.01) |
| *G06F 13/10* | (2006.01) |
| *G06F 9/4401* | (2018.01) |

(52) U.S. Cl.
CPC .......... *G06F 13/385* (2013.01); *G06F 13/105* (2013.01); *G06F 13/28* (2013.01); *G06F 13/426* (2013.01); *G06F 13/4282* (2013.01); *G06F 9/4411* (2013.01); *G06F 9/455* (2013.01); *G06F 2213/0042* (2013.01)

(58) Field of Classification Search
None
See application file for complete search history.

(56) References Cited

U.S. PATENT DOCUMENTS

| | | | | |
|---|---|---|---|---|
| 6,636,929 | B1 * | 10/2003 | Frantz ................ | G06F 11/0709 710/104 |
| 7,660,937 | B2 * | 2/2010 | Frantz ................ | G06F 13/107 710/311 |
| 9,319,349 | B2 * | 4/2016 | Naven ................ | H04L 49/30 |
| 9,418,181 | B2 * | 8/2016 | Myrick .............. | G06F 17/5009 |
| 9,811,480 | B2 * | 11/2017 | Christian ........... | G06F 13/105 |
| 10,007,630 | B2 * | 6/2018 | Naven ................ | H04L 49/30 |
| 10,235,195 | B2 * | 3/2019 | Iyer ................... | G06F 9/45558 |

(Continued)

FOREIGN PATENT DOCUMENTS

EP    3220713 A1 *   9/2017   ............ G06F 13/38

OTHER PUBLICATIONS

'Universal Serial Bus Specification' Revision 2.0, Apr. 27, 2000, pp. 17-18, 29-30, 123-124, 141-142. (Year: 2000).*

*Primary Examiner* — Steven G Snyder
(74) *Attorney, Agent, or Firm* — Hewlett Packard Enterprise Patent Department

(57) ABSTRACT

Various examples described herein provide for a management controller that includes a virtual universal serial bus (USB) host controller that can emulate an actual USB host controller to a central processor. A particular endpoint from a number of endpoints is associated with a virtual USB device that is coupled to the virtual USB host controller. The particular endpoint is to refer to a location in a management memory.

20 Claims, 5 Drawing Sheets

(56) References Cited

U.S. PATENT DOCUMENTS

| | | | |
|---|---|---|---|
| 10,248,596 B2* | 4/2019 | Iyer | G06F 13/36 |
| 10,296,369 B2* | 5/2019 | Iyer | G06F 9/45558 |
| 2008/0005446 A1* | 1/2008 | Frantz | G06F 13/107 |
| | | | 710/313 |
| 2012/0047309 A1* | 2/2012 | Natu | H04L 63/101 |
| | | | 710/314 |
| 2014/0195217 A1* | 7/2014 | Myrick | G06F 17/5009 |
| | | | 703/21 |
| 2014/0229764 A1* | 8/2014 | Emerson | G06F 11/3024 |
| | | | 714/13 |
| 2014/0376548 A1* | 12/2014 | Naven | H04L 49/30 |
| | | | 370/389 |
| 2016/0188517 A1* | 6/2016 | Naven | H04L 49/30 |
| | | | 710/316 |
| 2016/0371107 A1* | 12/2016 | Puthillathe | G06F 9/45558 |
| 2017/0344294 A1* | 11/2017 | Mishra | G06F 3/0622 |
| 2018/0225246 A1* | 8/2018 | Su | G06F 13/38 |
| 2018/0307513 A1* | 10/2018 | Iyer | G06F 9/45558 |
| 2018/0314540 A1* | 11/2018 | Iyer | G06F 9/45558 |
| 2018/0314658 A1* | 11/2018 | Iyer | G06F 13/36 |
| 2018/0322299 A1* | 11/2018 | Iyer | G06F 21/6218 |
| 2018/0335956 A1* | 11/2018 | Iyer | G06F 3/0613 |
| 2018/0336158 A1* | 11/2018 | Iyer | G06F 13/4282 |
| 2018/0349160 A1* | 12/2018 | Iyer | G06F 9/45558 |

* cited by examiner

MANAGEMENT CONTROLLER INCLUDING VIRTUAL USB HOST CONTROLLER

BACKGROUND

Within a computing device, a management controller, such as baseboard management controllers, can utilize Universal Serial Bus (USB) technology in coupling (and decoupling) various virtual peripheral devices to the computing devices on the fly. The management controller may employ such USB technology when mounting computer-readable media (e.g., CD-ROM image, virtual flash storage device) to the computing device, or when coupling virtual human interface devices (HIDs) (e.g., keyboard or mouse) to the host computing device. The ability to couple and decouple virtual peripheral devices to the computing device can be useful during management operations of a computing device by its management controller.

BRIEF DESCRIPTION OF THE DRAWINGS

Certain examples are described in the following detailed description in reference to the following drawings.

DETAILED DESCRIPTION

Figure 1:
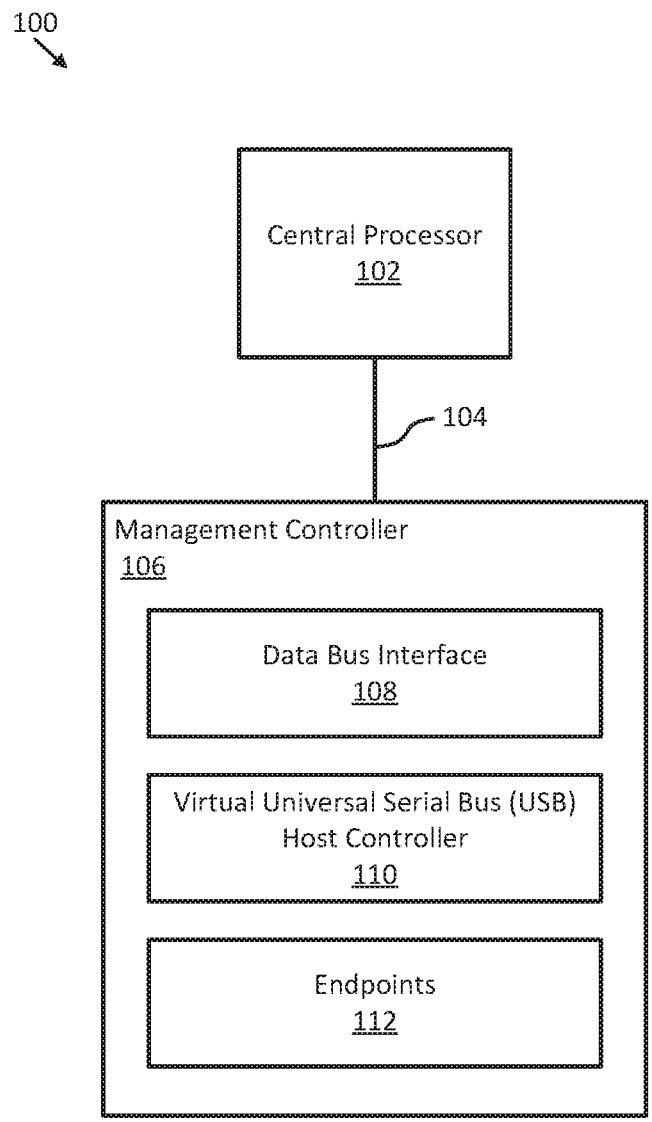
FIG. 1 is a block diagram illustrating example computing environment including an example management controller having a virtual universal serial bus (USB) host controller according to the present disclosure.

To support Universal Serial Bus (USB) connectivity between a central processor and a traditional management controller within a computing device, the traditional management controller can include a USB device controller and a physical USB interface coupling the USB device controller to a USB host controller associated with (e.g., included by or coupled to) the central processor. For instance, a physical USB interface (USB PHY) of a traditional management controller may physically couple a USB device controller of the traditional management controller to a USB host controller of a southbridge that is physically coupled to a central processing unit (CPU). By way of such a configuration, the USB device controller can present the CPU with a virtual USB device that the CPU can identify and access. As used herein, a virtual USB device can comprise a USB device emulated by a combination of hardware and software (e.g., firmware and a processing core of a management controller), such that the virtual USB device is perceived and treated as a physical USB device by components external to the virtual USB device (e.g., central processor). For instances where the virtual USB device presented comprises a virtual USB data storage device, the CPU can identify and access the USB data storage device as a boot device or a computer-readable data storage medium.

However, the use of USB device controllers and physical USB interfaces has limitations. For one, the use of a physical USB interface (e.g., USB PHY) in the management controller requires relatively high voltage input/output (I/O) interfaces compared to other interfaces that may be implemented to communicate with a CPU. It can be increasingly difficult to implement the USB PHY with smaller geometry silicon fabrication processes. The use of a physical USB interface in the management controller consumes a relatively large amount of area in the pad ring of the application specific integrated circuit (ASIC) implementing the management controller, which in turn increases the inscribed area and cost of the management controller. Additionally, extending the virtual USB device to multiple nodes would require the management controller ASIC to include multiple physical USB interfaces, tethering to each node's USB host controller.

The use of a USB device controller in the management controller also present challenges. A management controller typically wants to present multiple devices to the host through the physical USB interface, such as USB storage devices, keyboards, and mice. Although the USB specification permits a USB device controller to present a composite USB device, varying operating system support for such composite USB devices has been historically problematic and requires a fair amount of firmware intervention, data moving and hand-holding to implement all of which is very bus-centric. Further, typically buffers are located in the USB device controller and provisioned in multiple USB bus transactions.

Additionally, in the past, prior implementations of virtual USB device support on a management processor have involved constant handholding of individual endpoint data transfers by the management processor, which can not only limit the performance of the virtual USB device, but can also limit the overall performance of the management processor. In particular, for these prior implementations, a driver of an operating system running on the CPU would schedule transfers to/from endpoints included in the prior management processor. If one of those endpoints contains data and the USB schedule says to look for this data, the data is transferred from the endpoint to the CPU memory when that schedule element is processed by an actual USB host controller associated with the CPU. Similarly, if one of those endpoints can accept data and the USB schedule data structures say to transfer data to that endpoint, the data is transferred from CPU memory to the endpoint by the actual USB controller when that schedule element is processed by the actual USB controller. Each of these USB transactions would create an event for the management processor to handle, whereby as prior data is read out of one of its endpoints, the management processor has to go get more data, copy it into the endpoint buffer, and then "arm" the endpoint (i.e., marking it as ready for data transfer).

Accordingly, employing a USB device controller in the management controller can limit functionality, can limit performance of the management controller, and can necessitate inclusion of a physical USB bus in the management controller, which can add to the resource cost (e.g., space, power, etc.) and manufacturing cost of the management controller.

Various examples described herein provide for a management controller that includes a virtual universal serial bus (USB) host controller that can emulate an actual USB host controller to a central processor. Through the virtual USB host controller, a particular assignable endpoint, selected from a plurality of assignable endpoints, can be assigned to serve as an endpoint of a virtual USB device coupled to the virtual USB host controller.

In comparison to a USB device controller-based implementation, some examples permit implementation of a virtual USB device engine (e.g., virtual USB media engine) that has better performance, provides more USB device flexibility, has a smaller silicon footprint (on the management controller ASIC), has a simpler firmware programming model, and has architectural scalability for multi-node systems. Examples described herein can implement management controller USB support to multiple nodes, and do so more efficiently than a traditional USB device controller-based implementation.

In particular examples, a USB device redirection engine is implemented within a management controller, and can be implemented such that the USB device redirection engine utilizes the management controllers bus connection with its host computing device (e.g., Peripheral Component Interconnect Express [PCIe] connection) to communicate with the host computing device's central processor (e.g., CPU). The USB device redirection engine may operate a virtual USB host controller that through the bus connection, appears as a standard USB host controller (e.g., multi-port EHCI USB host controller) to host software operating (e.g., operating system) on the host computing device when the virtual USB host controller is presented to the host software. When the virtual USB host controller (e.g., virtual EHCI USB host controller) is presented to the host operating system, a standard host operating system driver (which likely already exists on the host computing device) can identify the class code of the standard USB host controller presented by the USB device redirection engine and can load the operating system USB host controller driver (e.g., standard EHCI driver) to facilitate operation between the operating system and the USB device redirection.

According to some examples, the virtual USB host controller of the management controller facilitates USB bus transactions with the central processor by way of direct memory access (DMA) transactions between main memory of the computing device coupled to the central processor, and management memory associated with (e.g., included within or coupled to) the management controller. Firmware code operating on the management controller can process incoming USB data requests, formulate or obtain USB data responses, and point the corresponding virtual USB device coupled to a virtual port of the virtual USB host controller to a prepared region in the management memory. A USB host controller driver (e.g., standard EHCI driver), operating on the operating system of the computing device, can place USB data transfer requests into associated asynchronous and periodic schedules in a manner similar to (e.g., exactly the same as) the way it usually would for a real USB host controller. The virtual USB host controller can execute its asynchronous and periodic transfer schedules until it finds a valid USB transfer descriptor to an "armed" virtual USB device endpoint. An "armed" virtual USB device endpoint may be one that is marked (e.g., by the management controller) as being ready to transfer data (e.g., makes a USB data transfer request ACK [acknowledged] instead of NAK [not acknowledged]). When this occurs, the virtual USB host controller can perform a data transfer according to the transfer descriptor.

Unlike a management controller that includes a USB device controller and a physical USB bus, USB data transactions between a central processor and an example management controller including a virtual USB host controller are not limited by data transfer rates of a physical USB. Rather, USB transfer descriptors in the virtual USB host controller can be processed by hardware of the example management controller and may only be limited by the execution speed of the example management controller, the transfer rate of the data bus (e.g., PCIe) between the example management controller and the central processor, or the data access time of the management memory used as virtual device endpoint buffers. As a result, the virtual USB host controller, which the example management controller presents to the central processor as an actual USB host controller, may (at times) transmit data at a rate that exceeds transfer rates that the central processor expects (e.g., in accordance with USB specifications). This can result in unexpected errors when the operating system driver is surprised with situations where USB data is received at rates impossible for an actual USB host controller over a physical USB bus. To ensure compatibility between the virtual USB host controller and the central processor, the virtual USB host controller can maintain temporal integrity by pacing each DMA transfer (between the main memory and the management memory) and conforming USB transactions according to USB frame/micro-frame timing specifications. In doing so, the virtual USB host controller can implement a speed governor over operations that would otherwise be throttled by bus (e.g., PCI-E) and memory (e.g., DRAM) access times.

According to some examples, the management controller can manage virtual USB devices coupled to the virtual USB host controller. In particular, firmware operating on the management controller can cause the construction or destruction of virtual USB devices, and can manage their virtual port couplings to the virtual USB host controller. The management controller can also manage a pool of flex endpoints (also referred to herein as assignable endpoints) each of which can be selectively assigned and mapped to a virtual USB device for use as one its endpoints (e.g., endpoint 1 [EP1]). As described herein, the pool of flex endpoints can permit varying endpoint configurations for virtual USB devices presented by the management controller to a central processor. The management controller can include a set of hardware registers that facilitate mapping configuration (e.g., endpoint mapping hardware registers). For various examples, the management controller can construct any number of possible virtual USB device configurations using the pool of flex endpoints and the set of endpoint mapping hardware registers.

For each flex endpoint, the management controller can associate a DMA descriptor referencing a location in the management memory that will serve as the buffer for the flex endpoint. As noted herein, the management controller may associate the DMA descriptor with a particular flex endpoint by way of a flex endpoint hardware register associated with the particular flex endpoint. For some examples, transfer descriptors processed by the virtual USB host controller reference a device address and an endpoint number, where the virtual USB host controller can use to the device address to identify the target virtual USB device and can map the endpoint number to one of the flex endpoints.

By obviating the need for implementing a physical USB PHY* and USB device on a management controller, various examples described herein reduce a silicon footprint of the management controller and lower the cost of implementing virtual USB support on management controller. Various examples described herein can provide scalable virtual USB device support by the management controller. Virtual USB host controllers described herein may not only have improved performance over previous virtual USB solutions implemented by management controllers, but may also reduce management controller processing utilization over previous virtual USB solutions implemented by management controllers. This can be useful in multi-node computing environments, especially as the host node count increases.

As used herein, modules and other components of various examples may comprise, in whole or in part, hardware (e.g., electronic circuitry), or a combination of hardware and programming (e.g., machine-readable instructions, such as firmware), to implement functionalities described herein. For instance, a module may comprise a combination of machine-readable instructions, stored on at least one non-transitory machine-readable storage medium, and at least one processing resource (e.g., controller) to execute those instructions. The machine-readable instructions may comprise processor-readable instructions executable by a processor to perform a set of functions in accordance with various examples described herein. In another instance, a module may comprise electronic circuitry to perform a set of functions in accordance with various examples described herein.

As used herein, a computing device can comprise a desktop, laptop, workstation, server (e.g., rack-mount server), or other device that operates by a processor. As used herein, Universal Serial Bus (USB) can describe a device or component that complies with any number of different Universal Serial Bus specification releases (e.g., USB 2.0 and USB 3.0).

As used herein, a management controller can include a hardware processor that is dedicated to management of the computing device, and that can execute in a separate or isolated manner from the main processor of the computing system. The hardware processor may be implemented as a single application specific integrated circuit (ASIC). An example of a management controller can include a baseboard management controller (BMC), which is a specialized microcontroller embedded on a motherboard of a computing device such as a server. A BMC can manage the interface between system management software and hardware of the computing device. A BMC of a computing device can provide remote management access to the computing device, and may provide such remote management access over an out-of-band communication channel, which isolates management communication from communication of an operating system (OS) running on the computing device. In some instances, the BMC may enable lights-out management of the computing device, which provides remote management access (e.g., system console access) to the computing device regardless of whether the computing device is powered on, whether a primary network subsystem hardware is functioning, or whether an OS is operating or even installed.

The following provides a detailed description of examples illustrated by FIGS. 1-5.

FIG. 1 is a block diagram illustrating example computing environment 100 including an example management controller having a virtual universal serial bus (USB) host controller according to the present disclosure. As shown, the computing environment 100 comprises a central processor 102 and a management controller 106 coupled to the central processor 102 by way of a data pathway 104. The management controller 106 comprises a data bus interface 108, a virtual universal serial bus (USB) host controller 110, and a plurality of endpoints 112. In various examples, the components or the arrangement of components in the computing environment 100 may differ from what is depicted in FIG. 1.

The central processor 102 may comprise a central processing unit (CPU) of a computing device, and may facilitate operation of an operating system and other software on the computing device. As shown, the central processor 102 is separate and distinct from the management controller 106. As described herein, the management controller 106 may comprise a baseboard management controller.

To communicate, the central processor 102 and the management controller 106 may communicate through the data pathway 104 included by the computing device. The data pathway 104 may comprise a data bus, such as Peripheral Component Interconnect Express (PCI), Peripheral Component Interconnect Express (PCIe), Intelligent Platform Management Bus/Bridge (IPMB), Inter-Integrated Circuit (I$^2$C), System Management Bus (SMBus or SMB), Low Pin Count bus (LPC bus), Enhanced Serial Peripheral Interface (eSPI), Advanced Microcontroller Bus Architecture (AMBA), or Advanced Extensible Interface (AXI). For certain examples, the data pathway 104 includes a set of core logic chips on a computing device motherboard, such as a northbridge (also known as a host bridge), a southbridge, or both.

The data bus interface 108 couples the management controller to the central processor 102 and does so through the data pathway 104. The data bus interface may comprise a physical interface (e.g., PCIe interface) that couples the management controller 106 to the data pathway 104. The data bus interface 108 may facilitate communication between virtual USB host controller 110 and with the central processor 102 such that the central processor 102 recognizes the virtual USB host controller 110 as an actual USB host controller.

The virtual universal serial bus (USB) host controller 110 may emulate an actual USB host controller to the central processor 102 through the data bus interface 108. For some examples, the virtual USB host controller 110 is emulated, at least in part, by firmware executing on a processing core (not shown) of the management controller 106. Specifically, the firmware executing on the management controller 106 implement USB host controller operations of the virtual USB host controller 110, and enable USB communication between the virtual USB host controller 110 and the central processor 102 over the data pathway 104. While emulating an actual USB host controller, the virtual USB host controller 110 may limit a transfer rate of USB packets from the virtual USB host controller 110 to the central processor to a rate in accordance with a USB specification that is being emulated. In doing so, the virtual USB host controller 110 can pace USB packets transfers from the virtual USB host controller 110 to the central processor 102 at a USB data rate expected by an operating system driver, thereby ensuring that the virtual USB host controller 110 does not exceed a USB data rate that complies with a USB specification release (e.g., USB 2.0) supported by OS driver.

In some examples, the endpoints 112 can be assignable endpoints. In some examples, one or more of the endpoints can be fixed endpoints. In one example, the plurality of endpoints 112 can comprise a particular assignable endpoint that the management controller 106 can selectively assign to serve as an endpoint of a virtual USB device coupled to the virtual USB host controller 110. Additionally, selectively assigning a particular assignable endpoint to serve as an endpoint of a virtual USB device coupled to the virtual USB host controller 110 may comprise assigning an endpoint number of the virtual USB device to the particular assignable endpoint, and may further comprise assigning an identifier associated with the virtual USB device (e.g., virtual device number) to the particular assignment endpoint. For instance, the virtual USB device may emulate a virtual USB keyboard and the management controller 106 may assign a particular assignment endpoint to serve as endpoint 0 (EP0) and another to serve as endpoint 1 (EP1) for the virtual USB device. The particular assignable endpoint may be assigned by the management controller 106 as a result of firmware executed on the management controller 106.

According to various USB specification releases, each USB device has at least an EP0. Accordingly, for examples where the management controller 106 supports a maximum of N virtual USB devices, the management controller 106 can include N hardware registers each dedicated to serve as an endpoint 0 (EP0) for one of those supported virtual USB devices. So for instance, with respect to a first virtual USB device coupled to the virtual USB host controller 110 and emulating a virtual USB keyboard, the management controller 106 can utilize a hardware register dedicated to serving as the endpoint 0 (EP0) for the first virtual USB device, and can assign a particular assignment endpoint serve as endpoint 1 (EP1) for the first virtual USB device.

For some examples, the virtual USB device coupled to the virtual USB host controller 110 is one provisioned, configured, and emulated by the management controller 106 (e.g., based on firmware that determines operation of the management controller 106). Additionally, in alternative examples, the virtual USB device coupled to the virtual USB host controller 110 is one provisioned, configured, and emulated by a component external to the management controller 106. The virtual USB device can include, without limitation, a USB storage device, a USB human input device (e.g., keyboard or mouse), a USB display device, USB network controller (e.g., Ethernet controller), or the like. From the plurality of endpoints 112, the management controller 106 can assign a different number of assignable endpoints (e.g., 1 to 8 assignment endpoints) to each different virtual USB device coupled to the virtual USB host controller 110. For examples where the management controller 106 includes N hardware registers each dedicated to serve as an endpoint 0 (EP0) for a particular virtual USB device, the management controller 106 may assign and use a set of assignable endpoints to serve as any remaining endpoints of the particular virtual USB device (e.g., as EP1 through EP7 of the particular virtual USB device). The number of assignable endpoints assigned to a particular virtual USB device may depend on the type of USB device being emulated by the virtual USB device (e.g., two endpoints for a USB mouse, and more than two endpoints for a composite USB device that combines a USB human input device with a USB storage device). Through use of the assignable endpoints and the virtual USB host controller 110, the management controller 106 can support a variable number of virtual USB devices and avoid the need for the management controller 106 to statically dedicate hardware registers to serve as the maximum number of endpoints for all USB devices. However, as noted above, it is contemplated that the management controller 106 can statically dedicate hardware registers.

Figure 2:
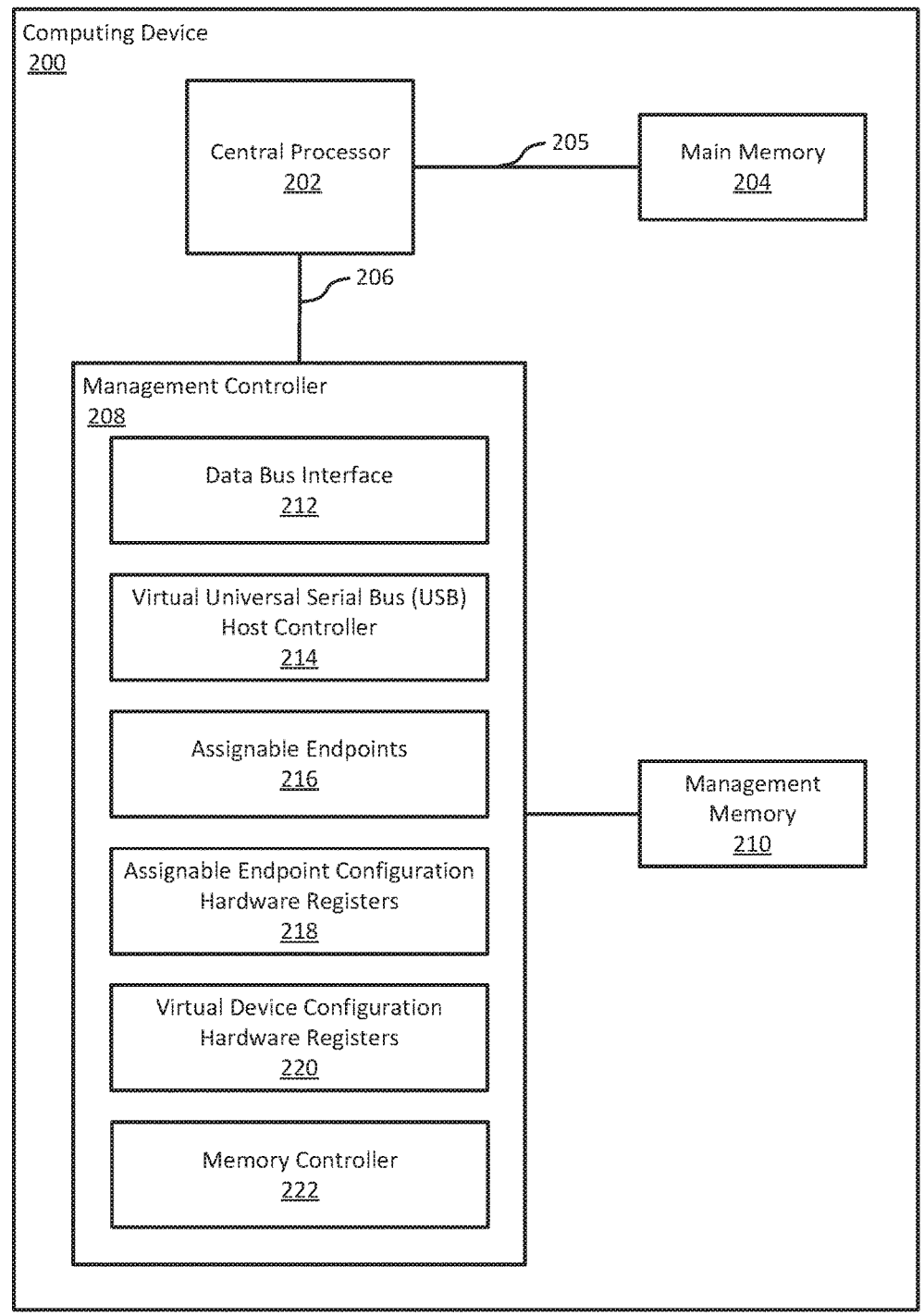
FIG. 2 is a block diagram illustrating an example computing device including an example management controller having a virtual universal serial bus (USB) host controller according to the present disclosure.

FIG. 2 is a block diagram illustrating an example computing device 200 including an example management controller having a virtual universal serial bus (USB) host controller according to the present disclosure. As shown, the computing device 200 comprises a central processor 202, main memory 204 coupled to the central processor 202 by way of a data pathway 205, a management controller 208 coupled to the central processor 202 by way of a data pathway 206, and management memory 210 coupled to the management controller 208. The management controller 208 comprises a data bus interface 212, a virtual universal serial bus (USB) host controller 214, a plurality of assignable endpoints 216, a plurality of assignable endpoint configuration hardware registers 218, a plurality of virtual device configuration hardware registers 220, and a memory controller 222. In various examples, the components or the arrangement of components in the computing device 200 may differ from what is depicted in FIG. 2.

The central processor 202 may be similar to the central processor 102 described above with respect to FIG. 1, and is separate and distinct from the management controller 208. The data pathway 206 may be similar to the data pathway 104 described above with respect to FIG. 1 and facilitate communication between the central processor 202 and the management controller 208. Another data pathway 205 may be implemented in a similar manger between the central processor 202 and the main memory 204.

As shown, the main memory 204 is coupled to the central processor 202 and is separate from the management memory 210, which is coupled to the management controller 208. In one example, main memory 204 may be coupled to the central processor 202 and/or the management controller 208 through a logic chip (not shown) or multiple logic chips, such as a memory controller or a northbridge. The main memory 204 may be accessible and utilized by the central processor 202, for example, while the central processor is operating an operating system. In this way, the main memory 204 may function as the system memory of the computing device. The management controller 208 may access a framelist USB schedule stored on the main memory 204, which facilitates USB communications between the central processor 202 and the management controller 208. In one example, the access may be provided via a bridging element included in the central processor 202 or another logic chip. The management memory 210 may be accessible and utilized by the management controller 208, for example, while the management controller 208 is performing out-of-band management operations on the computing device. The main memory 204 may comprise random access memory, such as dynamic random access memory (DRAM). Likewise, the management memory 210 may comprise random access memory. For some examples, the management memory 210 is included as part of the management controller 208.

For some examples, the data bus interface 212, the virtual universal serial bus (USB) host controller 214, and the plurality of assignable endpoints 216 is similar to the data bus interface 108, the virtual USB host controller 110, and the plurality of endpoints 112 described above with respect to FIG. 1.

The plurality of assignable endpoint configuration hardware registers 218 can support configuration or operation of a particular assignable endpoint, of the plurality of assignable endpoints 216, by storing store information regarding the particular assignable endpoint. For some examples, the information stored by the plurality of assignable endpoint configuration hardware registers 218 facilitates dynamic assignment of a particular assignable endpoint 216 to a virtual USB device by the management controller 208. For instance, the plurality of assignable endpoint configuration hardware registers 218 can include assignable endpoint mapping hardware registers that store the mapping between an endpoint of a virtual USB device (e.g., endpoint 2 [EP2]) and one of the assignable endpoints 216 assigned to serve as that endpoint (e.g., serve as EP2 of the virtual USB device). In particular, the assignable endpoint configuration hardware registers 218 can include a set of assignable endpoint mapping hardware registers that stores for each of the assignable endpoints 216, an endpoint number to be associated with the respective assignable endpoint and used to address the respective assignable endpoint in connection with a virtual USB device. The assignable endpoint configuration hardware registers 218 can also include a set of assignable endpoint mapping hardware registers that stores for each of the assignable endpoints 216, an identifier (e.g., virtual device number) of a virtual USB device to which the respective assignable endpoint is assigned.

The information stored in the assignable endpoint configuration hardware register 218 may include control data, status data, event data, or some combination thereof. The information for a particular assignable endpoint may also include Direct Memory Access (DMA) information (e.g., DMA address, DMA length) relating to a buffer in the management memory 210 that has been allocated for use by the management controller 208 to store actual data for the particular assignable endpoint. For some examples, the management controller 208 transfers USB packet payload data between a particular assignable endpoint and the central processor 202 by way of a DMA transfer between the main memory 204, which is accessible by the central processor 202, and the specific buffer in the management memory 210 associated with the particular assignable endpoint, which is accessible by the management controller 208. Accordingly, the plurality of assignable endpoint configuration hardware registers 218 can hold information regarding where in the management memory 210 data for a particular assignable endpoint is to be transferred. For particular examples, actual data for the particular assignable endpoint is stored in a buffer in the management memory 210 and excluded from the plurality of assignable endpoint configuration hardware registers 218.

The plurality of virtual device configuration hardware registers 220 may store information regarding a virtual USB device coupled to the virtual USB host controller 214. For some examples, the information stored by the plurality of virtual device configuration hardware registers 220 facilitates provisioning, configuration, or operation of the virtual USB device by the management controller 208. In connection with a particular virtual USB device, the information stored by the plurality of virtual device configuration hardware registers 220 may include, without limitation, control data, status data, interrupt data (e.g., interrupt status, enabling, or routing), setup data, or some combination thereof.

The memory controller 222 may store endpoint buffer data of the particular assignable endpoint on the management memory 210. The memory controller 222 can facilitate a direct memory access (DMA) transfer from the management memory 210 to the main memory 204 when a USB packet is communicated from an assignable endpoint of a virtual USB device to the central processor 202 through the virtual USB host controller 214.

With the approaches described herein, the assignable endpoints 216 can be used to point to portions of the management memory 210 that can be used for buffers for the virtual USB host controller 214. Because of this, a full USB controller need not be implemented in the management controller 208 and thus separate buffers for each endpoint need not be present on the ASIC.

In one example, the central processor 202 can learns about the size of the assignable endpoints 216 by scheduling control transactions to EP0 of the device and interrogating the results. Once the central processor 202 can learn the device type, number of endpoints, and size of endpoints, it can schedule transfers to/from endpoints in that device consistent with the type of device that is being presented by the virtual USB host controller 214.

USB has many defined types of devices, including human input devices (HID) such as keyboard mouse and mass storage devices. A mass storage device, for example, may implement two bulk data endpoints one for data going to the storage device, and one for data coming from the storage device. These endpoints are a fixed size (by the USB specification) so a driver, running under an OS running on the central processor 202. From the view of the OS, the OS can schedule transfers to/from these endpoints based on the desired operation (e.g. sector read) and the USB transfer rate.

If an endpoint contains data and the USB schedule says to look for this data, the data is transferred from the buffer location in the management memory 210 to main memory 204 when that schedule element is processed by the virtual USB host controller 214.

Similarly, if the assignable endpoint 216 can accept data in its portion of the management memory 210 and the USB schedule data structures indicate to transfer data to that assignable endpoint 216, the data is transferred from main memory 204 to the location in the management memory 210 pointed to by the assignable endpoint 216 when that schedule element is processed by the virtual USB host controller 214.

In typical USB devices, these endpoint transfers are treated atomically and require work to be performed on a per USB transaction basis. When the endpoint is not ready to receive data (OUT transaction) or when the endpoint doesn't have any new data to send (IN transaction), the transfer is not acknowledged by the host controller whenever that schedule element is executed. In some other implementations of "virtual devices", each USB transaction created an event for the management processor to handle. As data is read out of the endpoint, the management processor had to go get more data, copy it into the endpoint buffer, and then "arm" it.

To alleviate this type of continuous handholding, the assignable endpoints 216 can point to locations in management memory 210 instead of continuously filling a buffer with more information by a processor.

Going back to the example of a transfer from a mass storage device or other similar transfer device such as a networking device. If the central processor 202 requests data of size N from the mass storage device being virtualized, it will schedule multiple transactions from the buffer endpoint, in this case one of the assignable endpoints 216. Here, instead of populating the management memory 210 location with the requested data for the scheduled transaction, the management controller 208 can populate it with additional information. The size of the additional information can be customized, for example, to the request received, the type of device that is being virtualized, implementation of the server, custom parameters set by an administrator, combinations thereof, etc. For example, a request by the OS for information from a virtualized mass storage device for 16K of data may cause the management controller 208 to buffer the management memory 210 with 128K of data from the same location. This can take into account the likelihood that a request for such a transaction would likely request additional data. The size of data retrieved can be predetermined. Further, the predetermined size can be based on the type of device virtualized. For example, a CD or DVD may have a different predetermined size than a different type of mass storage device, such as an array of disk drives, or network controller.

In one example, if the central processor 202 issues a command to read 128 k of data and the endpoint size is 16 k, the management controller 208 can "arm" the assignable endpoint 216 with 128 k of data and as individual transactions referring to the specific data come, they are satisfied automatically because each USB transfer descriptor is processed until the endpoint runs out of data.

Similarly, when the central processor 202 wishes to provide information to an output location (e.g., to store information onto the mass storage device), the information can be stored in the management memory 210. The management controller 208 can then retrieve the information from the management memory 210 when it desires.

In one example, the management memory 210 is communicatively coupled to the memory controller 222. In this example, the memory controller is communicatively coupled to the data bus interface 212. Further, in this example, the data bus interface is communicatively coupled to the central processor 202 via data pathway 206 and the central processor 202 is communicatively coupled to the main memory 204 via data pathway 205. In this example, a processing core (not shown) of the management controller 208 can fill the buffers pointed to by the assignable endpoints 216 when needed to "arm" the buffers. As noted, additional information can be "armed." Because the additional information is "armed," the processing core need not spend time on the USB transaction while the information is "armed." Instead, the process can be offloaded to the data bus interface 212, virtual USB host controller 214, and memory controller 222.

In one example, the virtual USB host controller 214 is used by the management controller 208 to provide remote management services to the computing device 200. For example, the management controller 208 can be connected via a network connection to a remote device that can be used for remote management. In one example, a video device and human input devices can be virtualized to allow the remote device to use the OS environment remotely. Further, in another example, the user of the remote device may desire to transfer data from a storage device on the remote device to the OS environment.

Figure 3:
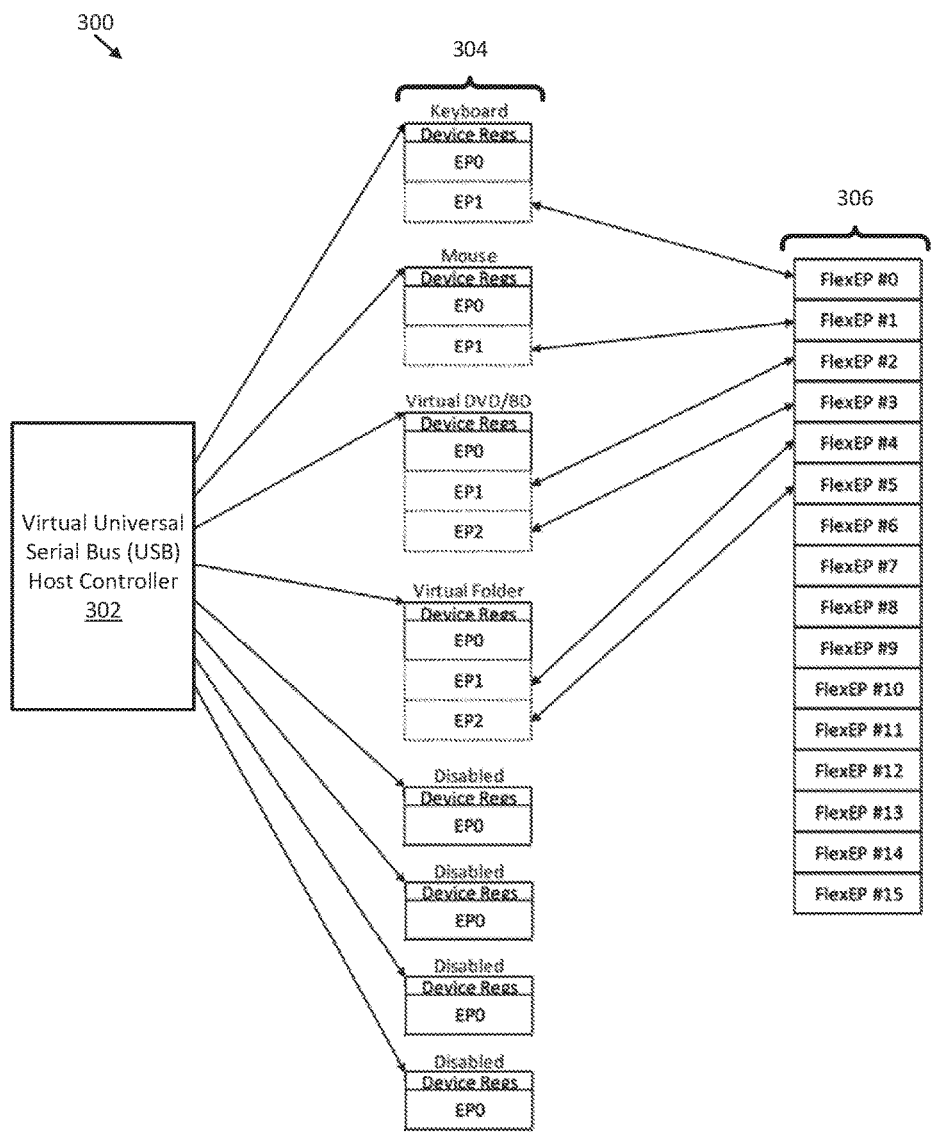
FIG. 3 is a diagram illustrating an example virtual universal serial bus (USB) host controller of a management controller and assignable endpoints of the management controller according to the present disclosure.

FIG. 3. is a diagram 300 illustrating an example virtual universal serial bus (USB) host controller 302 of a management controller and a plurality of assignable endpoints 306 of the management controller according to the present disclosure. In particular, the block diagram 300 illustrates how the virtual USB host controller 302 maps USB data received by the management controller (e.g., from a central processor) to the assignable endpoints 306 (e.g., FlexEP #0 through #5) assigned to a set of virtual USB devices 304. While the virtual USB host controller 302 maps USB transfer descriptors to the assignable endpoints 306, a central processor (not shown) may be running a USB host controller driver which initiates the USB transfers. The set of virtual USB devices 304 include a keyboard, a mouse, a virtual digital versatile disc (DVD)/Blu-ray disc (BD) device, and a virtual folder. As described herein, at least one of the virtual USB devices 304 may be provisioned, configured, and emulated by the management controller.

As shown and noted herein, according to some examples, endpoint 0 (EP0) of each of virtual USB devices 304 is assigned to physical hardware register of the management controller given that each virtual USB device has at least an EP0 but may have one or more additional endpoints (which would be assigned to assignable endpoints). As also shown, EP1 of the virtual USB keyboard is assigned to Flex EP #0, EP1 of the virtual USB mouse is assigned to Flex EP #1, EP1 and EP2 of the virtual USB DVD/BD are respectively assigned to Flex EP #2 and Flex EP#3, and EP1 and EP2 of the virtual USB folder are respectively assigned to Flex EP #4 and Flex EP#5, In alternative examples, all endpoints of a virtual USB device, including EP0, are assigned to an assignable endpoint. As additional virtual USB devices are provisioned, available assignable endpoints 306 may be assigned to those additional virtual USB devices, and as one or more of the existing virtual USB devices 304 are de-provisioned, their respective assignable endpoints can be released into the pool of assignable endpoints 306 for re-assignment.

Figure 4:
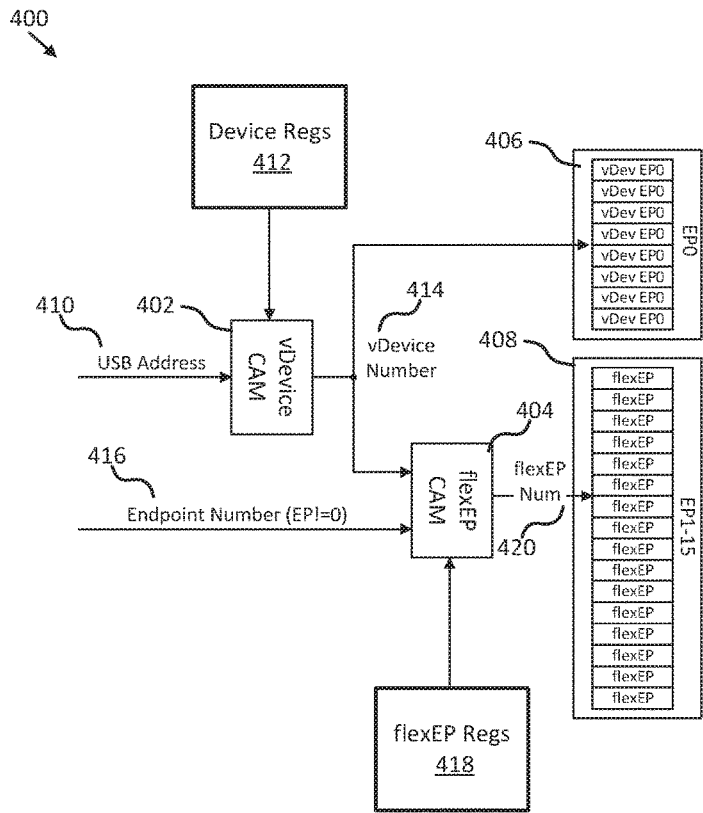
FIG. 4 is a block diagram illustrating example virtual universal serial bus (USB) addressing logic utilized by an example virtual USB host controller according to the present disclosure.

FIG. 4 is a block diagram 400 illustrating example virtual universal serial bus (USB) addressing logic utilized by an example virtual USB host controller according to the present disclosure. For instance, the virtual USB host controller 110 described with respect to FIG. 1, or the virtual USB host controller 214 described with respect to FIG. 2. For some examples, the logic represented by the block diagram 400 is implemented by a management controller. For some examples, code running on a management controller can process incoming USB requests using the virtual USB addressing logic illustrated by the block diagram 400, and can point the corresponding virtual USB device attached to the virtual port of the virtual host controller to the prepared region in management system based on the virtual USB address logic.

The block diagram 400 illustrates the eight (8) hardware registers 406 to serve as endpoint 0 (EP0) for up to eight (8) separate virtual USB devices (also referred to herein as virtual devices or vDevices). The block diagram 400 also illustrates sixteen (16) assignable endpoints 408 (also referred to in FIG. 4 as flexEPs) from which the management controller can assign to serve as endpoints (EP1 and above) for the virtual USB devices. As noted herein, virtual device (vDevice) hardware registers 412 may store information that facilitates provisioning, configuration, or operation of the vDevice, while flex endpoint (flexEP) hardware registers 418 may store information that facilitates dynamic assignment of a particular assignable endpoint from the assignable endpoints 408 to a vDevice.

The block diagram 400 includes a virtual USB device (vDevice) content accessible memory (CAM) 402 representing mapping logic (e.g., programmable mapping logic) that determines a vDevice number 414 based on information from the vDevice hardware registers 412 and a USB address 410 associated with a vDevice being targeted for access. The determined vDevice number 414 can identify which of the hardware registers 406 serves as endpoint 0 (EP0) for the USB address 410 for the targeted vDevice. The block diagram 400 includes a flexEP CAM 404 representing mapping logic (e.g., programmable mapping logic) that determines a flex endpoint (flexEP) number 420 based the vDevice number 414 provided by the vDevice CAM 402, and based on an endpoint number 416 for an endpoint of the vDevice associated with the USB address 410 targeted for access.

Figure 5:
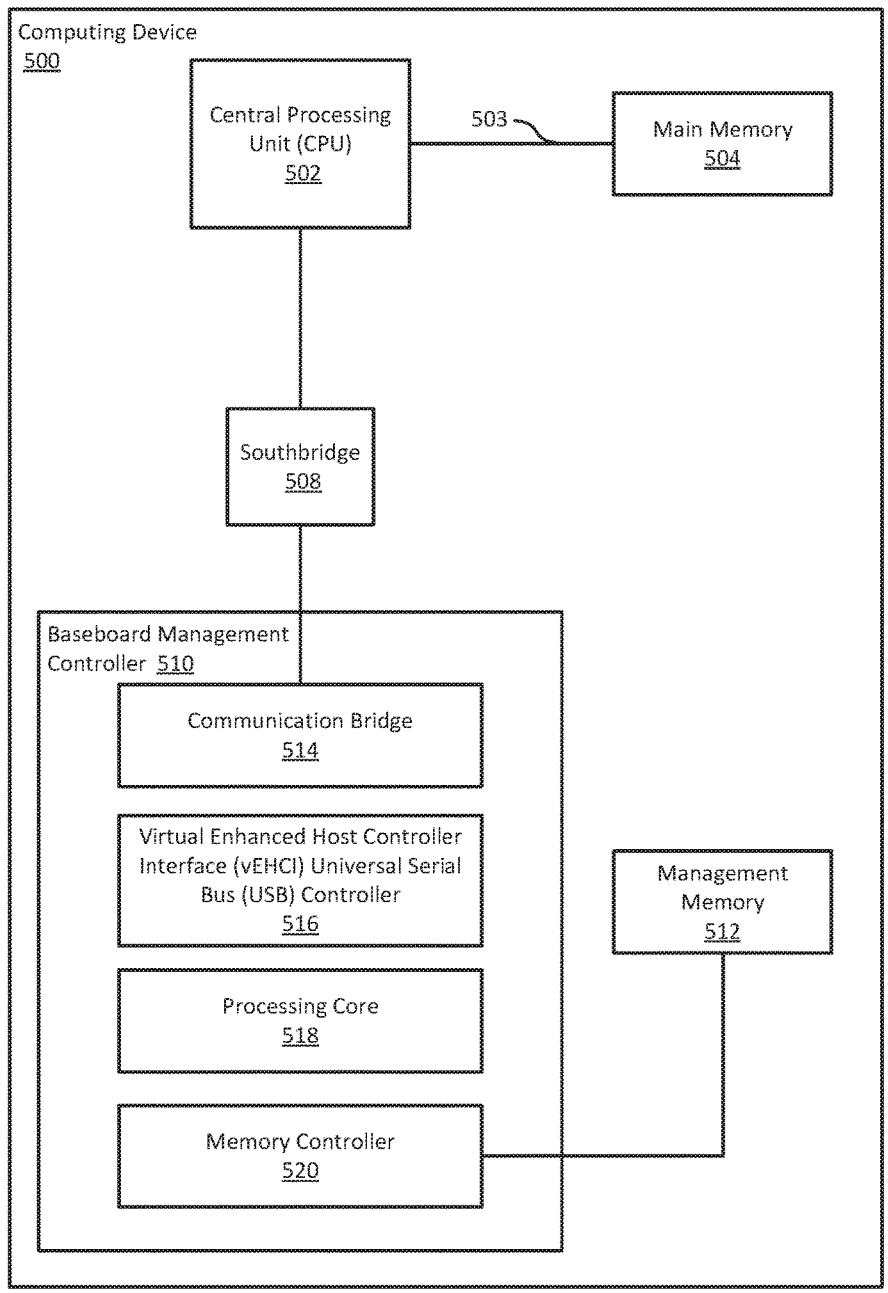
FIG. 5 is a block diagram illustrating an example computing device including an example management controller having a virtual universal serial bus (USB) host controller according to the present disclosure.

FIG. 5 is a block diagram illustrating an example computing device 500 including an example management controller having a virtual universal serial bus (USB) host controller according to the present disclosure. As shown, the computing device 500 includes a central processing unit (CPU) 502, a southbridge 508 coupled to the CPU 502, a main memory 504 coupled to the CPU 502, via a data pathway, a baseboard management controller (BMC) 510 coupled to the southbridge 508, and a management memory 512 coupled to the BMC 510, As shown in FIG. 5, CPU 502 represents one or more CPUs. The BMC 510 includes a communications bridge 514, a virtual Enhanced Host Controller Interface (vEHCI) Universal Serial Bus (USB) controller 516, a processing core 518, and a memory controller 520. The computing device 500 include a device operated by a processor including, without limitation, a desktop, a laptop, a workstation, and a server (e.g., rack-mount server). In various examples, the components or the arrangement of components in the computing device 500 may differ from what is depicted in FIG. 5.

The CPU 502 may facilitate operation of an operating system and other software on the computing device 500. As shown, the CPU 502 is separate and distinct from the BMC 510. Moreover, the CPU 502 can be communicatively coupled to main memory 504 via a data pathway 503, The southbridge 508 can comprise a core logic chip included by the computing device 500 to facilitate input/output (I/O) communication between the CPU 502 and the BMC 510. Through the southbridge 508, the CPU 502 can communicate a USB request to the BMC 510, and can receive a USB response from the BMC 510.

According to some examples, the communications bridge 514 communicatively couples the BMC to the southbridge 508 over a data bus, such as a Peripheral Component Interconnect Express (PCI-E) bus. Accordingly, for some examples, the communications bridge 514 includes a serializer/deserializer (SERDES) and a PCI-E controller. Through the communications bridge 514, the virtual vEHCI USB host controller 516 can communicate with the CPU 502 and/or be used for direct memory transfer between the main memory 504 and management memory 512. In some examples, a bridging element included in the CPU 502 can be used to facilitate the direct memory transfer. As described herein, the processing core 518 can facilitate operation of the virtual vEHCI USB host controller 516, Additionally, the processing core 518 can instruct the memory controller 520 to execute memory transfers (e.g., direct memory access [DMA] transfers) from the management memory 512 to the main memory 504. As described herein, such a memory transfer can implement transfer of a USB packet payload, from a buffer in the management memory 512 associated with an assignable endpoint to the main memory 504, in response to a USB request received from the CPU 502 by the BMC 510 through the communications bridge 514.

Though not shown, the example illustrated in FIG. 5 could be applicable to a multi-node computing environment having more than one central processor unit (CPU) complex, where each CPU complex can include a main memory, one or more CPU's coupled to that main memory (e.g., as a global memory pool from a direct memory access perspective), and its own USB host controller that communicates with a management controller, such as the BMC 510. For each of the CPU complexes, the management processor could include a separate SERDES and vEHCI USB host controller. Each SERDES and vEHCI USB host controller may couple to a CPU complex through a separate set of core logic chips (e.g., northbridge and southbridge) associated with the CPU complex, or may directly coupled to the CPU complex over a communication bus (e.g., PCI-E bus). By having a separate vEHCI USB host controller for each CPU complex, each CPU complex has the benefit of its own USB data transfer schedule.

In the foregoing description, numerous details are set forth to provide an understanding of the subject disclosed herein. However, various examples may be practiced without some or all of these details. Some examples may include modifications and variations from the details discussed above. It is intended that the appended claims cover such modifications and variations.

The invention claimed is:

1. A management controller, comprising:
a data bus interface to couple the management controller to a central processor;
a virtual universal serial bus (USB) host controller to emulate an actual USB host controller to the central processor through the data bus interface; and
a plurality of endpoints,
the management controller to store mapping information dynamically assigning the plurality of endpoints to virtual USB devices coupled to the virtual USB host controller, and
the management controller to associate, with the plurality of endpoints, information referencing respective locations in a management memory, the locations in the management memory allocated as buffers for storing data of respective endpoints of the plurality of endpoints.

2. The management controller of claim 1, wherein a particular endpoint is selectively assigned to a virtual USB device by firmware executed on the management controller.

3. The management controller of claim 1, wherein the mapping information comprises endpoint numbers or identifiers of virtual USB devices assigned to respective endpoints of the plurality of endpoints.

4. The management controller of claim 1, comprising a set of assignable endpoint configuration hardware registers to store information regarding the plurality of endpoints.

5. The management controller of claim 1, comprising a set of virtual device configuration hardware registers to store information regarding the virtual USB devices.

6. The management controller of claim 1, comprising a memory controller to store endpoint buffer data associated with a particular endpoint of the plurality of endpoints in the management memory, the management memory being separate from a main memory coupled to the central processor.

7. The management controller of claim 6, wherein the management memory is external to the management controller.

8. The management controller of claim 6, wherein the management controller is to determine a request for data received via the data bus interface for the particular endpoint and to populate the endpoint buffer data with more than the requested data.

9. The management controller of claim 8, wherein a subsequent request for additional data that is populated in the endpoint buffer data is to be transferred without intervention from the management controller via a direct memory access.

10. The management controller of claim 1, comprising a memory controller to access the management memory that is separate from a main memory coupled to the central processor, wherein a USB packet is communicated from the virtual USB host controller via a direct memory access (DMA) transfer between the management memory and the main memory.

11. The management controller of claim 1, wherein the virtual USB host controller is to limit a transfer rate of USB packets from the virtual USB host controller to the central processor to a maximum rate supported by a USB specification emulated by the virtual USB host controller.

12. A computing device, comprising:
a central processor;
a main memory coupled to the central processor;
a management controller coupled to the central processor by a data bus; and
a management memory coupled to the management controller, the management controller including:
a virtual universal serial bus (USB) host controller to emulate an actual USB host controller to the central processor over the data bus; and
a plurality of assignable endpoints selectively assignable to virtual USB devices coupled to the virtual USB host controller, the management controller to store mapping information dynamically assigning the plurality of assignable endpoints to the virtual USB devices, and the management controller to associate, with the plurality of assignable endpoints, information referencing respective locations in the management memory, the locations in the management memory allocated as buffers for storing endpoint buffer data of respective assignable endpoints of the plurality of assignable endpoints.

13. The computing device of claim 12, further comprising a firmware executable on the management controller to assign a particular assignable endpoint to a virtual USB device.

14. The computing device of claim 12, wherein the mapping information comprises endpoint numbers or identifiers of the virtual USB devices assigned to respective assignable endpoints of the plurality of assignable endpoints.

15. The computing device of claim 12, wherein the virtual USB host controller is to communicate USB data via a direct memory access (DMA) transfer between the management memory and the main memory.

16. The computing device of claim 12, wherein the virtual USB host controller is to limit a transfer rate of USB data from the virtual USB host controller to the central processor to a rate supported by a USB specification that is virtualized.

17. The management controller of claim 1, further comprising configuration registers to store the mapping information dynamically assigning the plurality of endpoints to the virtual USB devices.

18. The management controller of claim 1, wherein the information referencing the respective locations in the management memory comprises direct memory access (DMA) addresses useable to perform DMA transfers for the respective endpoints between the locations in the management memory and a system memory separate from the management memory.

19. The computing device of claim 12, further comprising configuration registers to store the mapping information dynamically assigning the plurality of assignable endpoints to the virtual USB devices.

20. The computing device of claim 12, wherein the information referencing the respective locations in the management memory comprises direct memory access (DMA) addresses useable to perform DMA transfers for the respective assignable endpoints between the locations in the management memory and the main memory separate from the management memory.

* * * * *